(12) United States Patent
Park et al.

(10) Patent No.: US 10,413,863 B2
(45) Date of Patent: Sep. 17, 2019

(54) COLD TRAP

(71) Applicant: Samheung Energy Co., Ltd., Sejong (KR)

(72) Inventors: Kwang Sin Park, Sejong (KR); Hye Joong Kim, Sejong (KR); Byeong San Kim, Sejong (KR)

(73) Assignee: Samheung Energy Co., Ltd., Sejong (KR)

( * ) Notice: Subject to any disclaimer, the term of this patent is extended or adjusted under 35 U.S.C. 154(b) by 278 days.

(21) Appl. No.: 15/445,611

(22) Filed: Feb. 28, 2017

(65) Prior Publication Data

US 2018/0140995 A1   May 24, 2018

(30) Foreign Application Priority Data

Nov. 22, 2016   (KR) .................. 10-2016-0155984

(51) Int. Cl.
  *B01D 53/26*   (2006.01)
(52) U.S. Cl.
  CPC .................. *B01D 53/265* (2013.01)
(58) Field of Classification Search
  CPC ............ B01D 53/265; B01D 8/00; F26B 5/04
  See application file for complete search history.

(56) References Cited

U.S. PATENT DOCUMENTS

| | | | | |
|---|---|---|---|---|
| 3,164,320 A | * | 1/1965 | Welbourn | H01J 41/12 417/313 |
| 5,289,641 A | * | 3/1994 | Balamuta | F26B 25/006 34/74 |
| 8,408,013 B2 | * | 4/2013 | Muse | B01D 53/265 62/3.4 |
| 2007/0268944 A1 | * | 11/2007 | Voss | H01S 3/036 372/34 |

FOREIGN PATENT DOCUMENTS

| KR | 10-2000-0056317 A | 9/2000 |
|---|---|---|
| KR | 10-2006-0013926 A | 2/2006 |

* cited by examiner

*Primary Examiner* — Brian M King
(74) *Attorney, Agent, or Firm* — Chernoff, Vilhauer, McClung & Stenzel, LLP (57) ABSTRACT

A cold trap includes: a main body connected to an exhaust line between a vacuum dryer and a vacuum pump; a trap portion installed in the main body and that freezes evaporated steam supplied from the vacuum dryer; and an insulation portion installed between the main body and the trap portion and that blocks cold of the trap portion from being conducted to the main body.

17 Claims, 6 Drawing Sheets

COLD TRAP

CROSS-REFERENCE TO RELATED APPLICATION

This application claims the benefit of priority of Korean Patent application No. 10-2016-0155984, filed on Nov. 22, 2016, all of which are incorporated by reference in their entirety herein.

BACKGROUND OF THE INVENTION

Field of the Invention

The present invention relates to a cold trap, and more particularly, to a cold trap that can secure stability of a product by having a perfect insulation structure while preventing a life-span or a performance of a vacuum pump from being deteriorated by freezing evaporated steam occurring in a dryer, an evaporator, a concentrator, a defoamer, and an extractor having a vacuum structure.

Description of the Related Art

In general, when a dryer, an evaporator, a concentrator, a defoamer, and an extractor perform a function thereof, evaporated steam occurs therein.

The generated evaporated steam is supplied to a suction device such as a vacuum pump.

In this case, the dryer, the evaporator, the concentrator, the defoamer, and the extractor have a vacuum structure and are connected to a vacuum pump without a separate exhaust means that discharges evaporated steam.

That is, evaporated steam is entered into a vacuum pump without a separate filtering means, and in such a case, moisture together with evaporated steam is entered into the vacuum pump and thus there is a problem that a life-span and a performance of the vacuum pump rapidly deteriorate.

Therefore, conventionally, by removing evaporated steam with a freeze method through a refrigerant and M.E.G-series or P.E.G-series antifreeze or an alcohol-series material by installing a cold trap between the dryer, the evaporator, the concentrator, the defoamer, and the extractor and the vacuum pump, the vacuum pump was protected.

In general, the cold trap includes a main body formed in a box shape, a freezing motor installed at an internal space of the main body, a receiving portion that receives antifreeze or alcohol therein, and a refrigerant circulation pipe installed within the receiving portion and that enables evaporated steam to freeze at hyalin by circulating a refrigerant supplied from the freezing motor.

However, in a conventional cold trap, because a main body and a receiving portion made of a stainless steel material were coupled and used by welding, cold of the receiving portion is transferred to the main body and thus there is a problem that a dew condensation phenomenon occurs in the main body.

In this way, when a dew condensation phenomenon occurs, water is pooled at an upper surface of the main body, and there is a problem that the pooled water flows to various electronic components installed in the main body to cause a short circuit accident.

Further, because the receiving portion cooled by a refrigerant circulation portion exchanges a heat with the main body not to maintain a predetermined temperature, the conventional cold trap cannot efficiently freeze evaporated steam and therefore there is a problem that energy efficiency is deteriorated.

PRIOR ART DOCUMENT

Patent Document (Patent document 1) Korean Patent Laid-Open Publication No. 10-2000-0056317 (Sep. 15, 2000)
(Patent document 2) Korean Patent Laid-Open Publication No. 10-2006-0013926 (Feb. 14, 2006)

SUMMARY OF THE INVENTION

The present invention has been made in view of the above problems and provides a cold trap that can secure stability of a product by beforehand preventing a short circuit accident and that can prevent a dew condensation phenomenon and enhance energy efficiency and a product performance by having a perfect insulation structure while preventing a life-span or a performance of a vacuum pump from being deteriorated by freezing evaporated steam occurring in a dryer, an evaporator, a concentrator, a defoamer, and an extractor having a vacuum structure.

In accordance with an aspect of the present invention, a cold trap includes: a main body connected to an exhaust line between a vacuum dryer and a vacuum pump; a trap portion installed in the main body and that freezes evaporated steam supplied from the vacuum dryer; and an insulation portion installed between the main body and the trap portion and that blocks cold of the trap portion from being conducted to the main body.

The cold trap may further include a heat discharge unit formed at an upper portion of a side wall of the main body and for discharging a heat existing at an internal space of the main body to the outside, wherein the heat discharge unit may include: a base having an installation space therein; and a plurality of discharge induction portions formed at a gap in a vertical direction of the installation space to form a heat discharge passage therebetween, and wherein the discharge induction portion may have a tilt angle gradually receding from the internal space of the main body, as advancing from a lower portion to an upper portion in order to enhance discharge efficiency of a heat.

The main body may have a first receiving hole penetrated in a vertical direction at an upper surface, the insulation portion may have a second receiving hole penetrated in a vertical direction and may be received at an upper surface of the main body such that the second receiving hole is positioned on a vertical line of the first receiving hole, and an upper edge of the trap portion may be received at an upper surface of the insulation portion while the trap portion is received in the first receiving hole and the second receiving hole.

In the insulation portion and the main body, a plurality of fastening holes connected in a vertical direction while being penetrated in a vertical direction may be each formed, and the cold trap may further include a pressing fixing portion that comes in close contact with the main body by pressing the insulation portion while being sequentially fastened to the fastening hole of the insulation portion and the fastening hole of the main body.

At an upper surface of the main body, an insertion groove separated at a predetermined gap along an edge of the first receiving hole may be formed, and the cold trap may further include: a rotation portion rotatably connected in a vertical direction along an edge of the insulation portion; and a fixing portion configured with an insertion protrusion formed at a bottom surface of the rotation portion and inserted into the insertion groove, when the rotation portion rotates in a lower direction.

The rotation portion may be formed in a step shape or a wave shape.

Advantages

In a cold trap according to the present invention, by beforehand preventing a short circuit accident from occurring, as water flows into various electronic components installed in a main body by preventing moisture from occurring by preventing a dew condensation phenomenon from occurring in the main body, stability of the cold trap can be secured.

Because a temperature of a cooled receiving portion is not lowered by exchanging a heat with the main body, the inside of the receiving portion may maintain a predetermined temperature and thus energy efficiency is maximized and evaporated steam can be efficiently removed.

BRIEF DESCRIPTION OF THE DRAWINGS

The objects, features and advantages of the present invention will be more apparent from the following detailed description in conjunction with the accompanying drawings, in which.

DETAILED DESCRIPTION OF EXEMPLARY EMBODIMENTS

Hereinafter exemplary embodiments of the present invention will be described in detail with reference to the attached drawings such that the present invention can be easily put into practice by those skilled in the art. As those skilled in the art would realize, the described embodiments may be modified in various different ways, all without departing from the spirit or scope of the present invention. Like reference numerals designate like elements throughout the specification.

Figure 1:
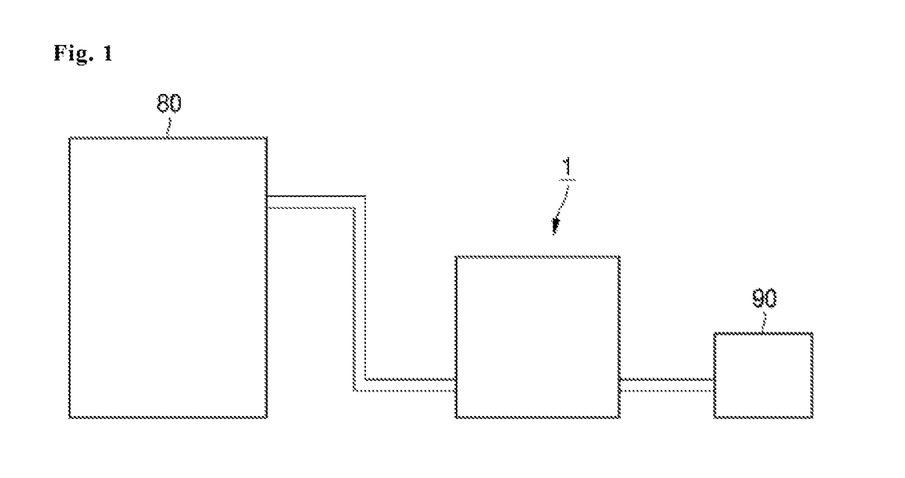
FIG. 1 is a diagram illustrating a cold trap connected between a vacuum dryer and a vacuum pump according to an exemplary embodiment of the present invention.
Figure 2:
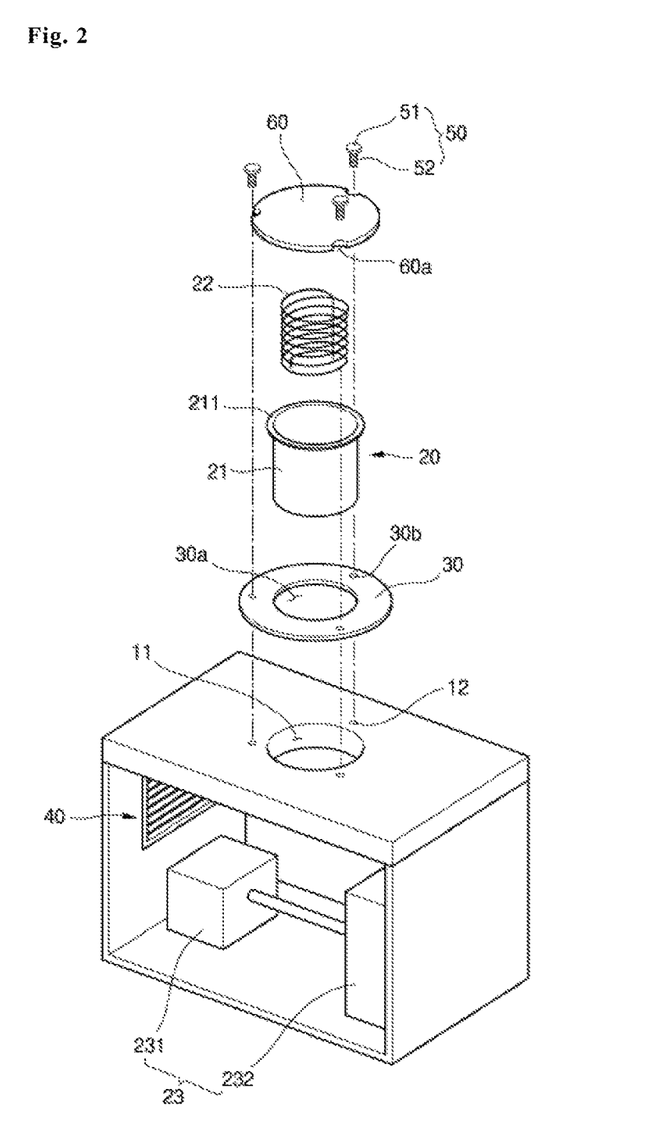
FIG. 2 is an exploded perspective view illustrating a cold trap according to an exemplary embodiment of the present invention.
Figure 3:
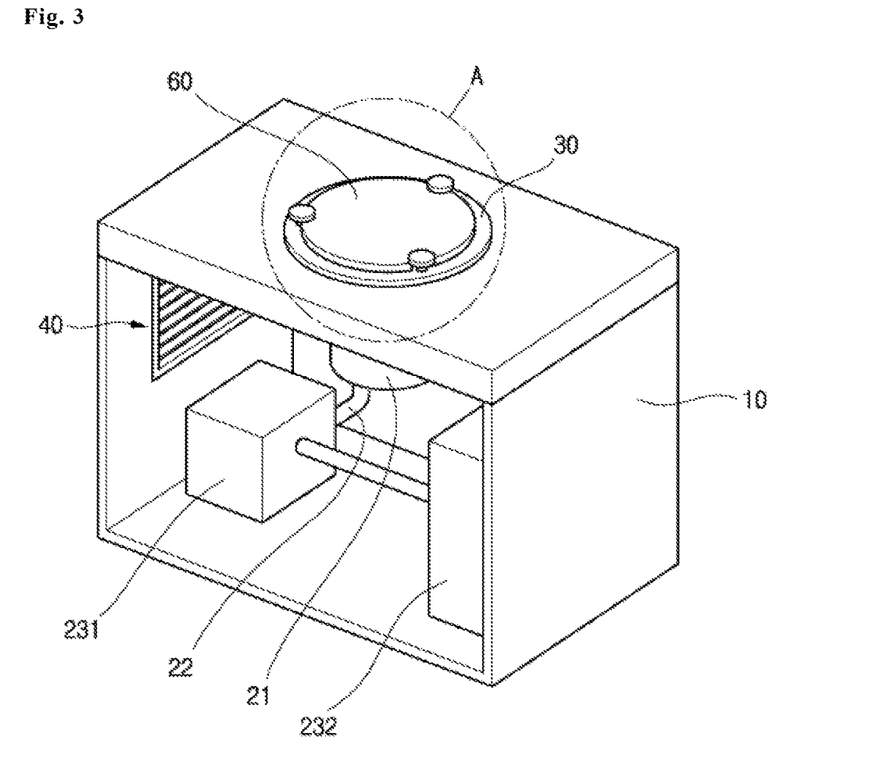
FIG. 3 is a coupled perspective view illustrating a cold trap according to an exemplary embodiment of the present invention.
Figure 4:
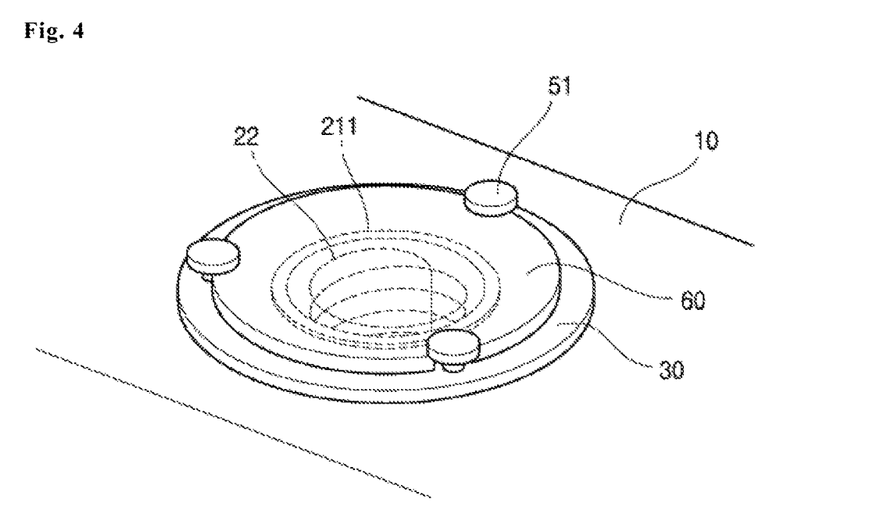
FIG. 4 is an enlarged perspective view illustrating a portion A of FIG. 3.
Figure 5:
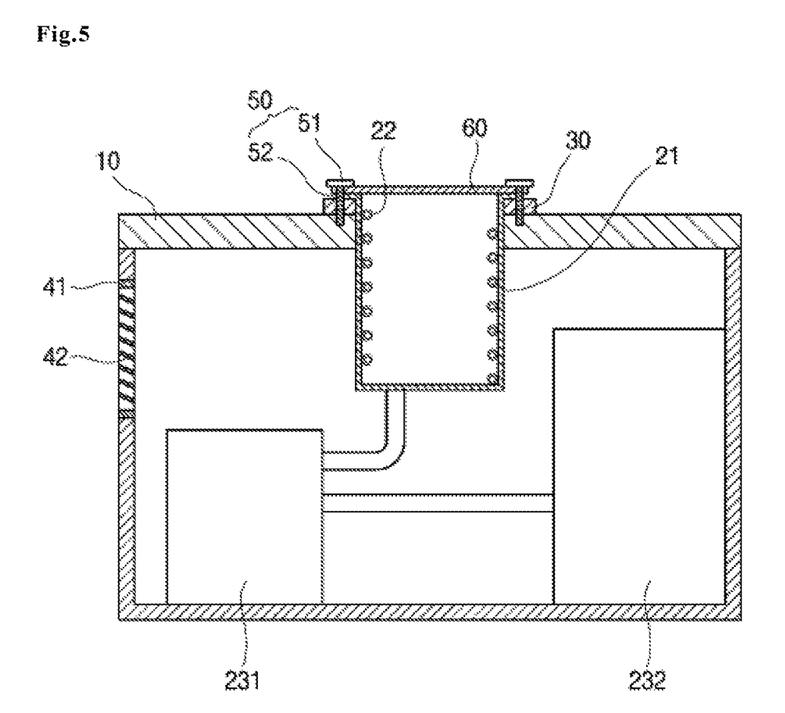
FIG. 5 is a cross-sectional view illustrating a cold trap according to an exemplary embodiment of the present invention.

FIG. 1 is a diagram illustrating a cold trap connected between a vacuum dryer and a vacuum pump according to an exemplary embodiment of the present invention, FIG. 2 is an exploded perspective view illustrating a cold trap according to an exemplary embodiment of the present invention, FIG. 3 is a coupled perspective view illustrating a cold trap according to an exemplary embodiment of the present invention, FIG. 4 is an enlarged perspective view illustrating a portion A of FIG. 3, and FIG. 5 is a cross-sectional view illustrating a cold trap according to an exemplary embodiment of the present invention.

A cold trap 1 according to an exemplary embodiment of the present invention is installed on an exhaust line between a vacuum dryer 80 and a vacuum pump 90 to remove evaporated steam discharged from the vacuum dryer 80 and to enable only air to be transferred to the vacuum pump 90, and thus the cold trap 1 is in a perfect insulation state to prevent a dew condensation phenomenon from occurring and energy efficiency and a performance of a product can be enhanced, by beforehand preventing a short circuit accident, stability of the product can be secured, and the cold trap 1 includes a main body 10, a trap portion 20, and an insulation portion 30.

The main body 10 has a first receiving hole 11 penetrated in a vertical direction at an upper surface, is a housing having an empty space therein, and at least one side surface thereof may be opened and closed.

At an internal space of the main body 10, the trap portion 20 to be described later and various elements for electronically controlling the trap portion 20 are installed.

At an outer surface of the main body 10, a controller (not shown) may be installed, and in the controller, a switch (not shown) for turning on or off the trap portion 20, and a switch (not shown) for controlling a temperature of the trap portion 20, and a liquid crystal display unit (not shown) for displaying a temperature of the trap portion 20 with a numeral may be provided.

Such a main body 10 may be made of a stainless steel material.

At a side wall of the main body 10, a rectangle-shaped installation hole is formed, and in the installation hole, a heat discharge unit 40 is installed.

By discharging heat occurring by operation of the trap portion 20 to the outside of the main body 10, the heat discharge unit 40 enables the inside of the main body 10 to maintain an appropriate temperature and includes a base 41 and a discharge induction portion 42.

The base 41 is installed in the installation hole and is formed in a rectangular frame shape to have an installation space therein.

The discharge induction portion 42 may be formed in a rectangle bar shape and is installed at a gap in a vertical direction of the installation space.

Thereby, a discharge passage is formed between the discharge induction portions 42 to easily discharge a heat existing at an internal space of the main body 10.

In this case, as advancing from a lower portion to an upper portion, the discharge induction portion 42 has a tilt angle gradually receding from the internal space of the main body 10.

That is, because hot air moves upward, the heat discharge unit 40 is formed at an upper portion of a side wall of the main body 10, and the discharge induction portion 42 is produced to have the tilt angle and thus a heat moved upward from the internal space of the main body 10 may be quickly discharged through the discharge passage.

The trap portion 20 is installed at the main body 10 to enable only air to be transferred to the vacuum pump 90 by freezing evaporated steam discharged from the vacuum dryer 80 and may include a receiving portion 21 and a refrigerant circulation pipe 22.

In the receiving portion 21, an empty space whose upper surface is opened and that may house antifreeze and hyalin (not shown) therein is formed.

The receiving portion 21 is received at the first receiving hole 11 of the main body 10, and an upper portion thereof is protruded to an upper portion of the main body 10.

In this case, a receiving flange 211 received at an upper surface of the trap portion 20 to be described later is protruded in a horizontal direction along an edge of the upper end of the receiving portion 21.

The refrigerant circulation pipe 22 is installed at an empty space of the receiving portion 21 and is formed in a coil shape, and a flow channel in which a refrigerant moves is formed therein.

In a state in which a portion of the refrigerant circulation pipe 22 is protruded to the outside of the receiving portion 21, the refrigerant circulation pipe 22 is connected to a refrigerant supply unit 23 configured with a freezing motor 231 and a radiator 232. In this case, the refrigerant supply unit 23 may be installed at an internal space of the main body 10.

That is, the freezing motor 231 supplies a refrigerant to a flow channel of the refrigerant circulation pipe 22, and the supplied refrigerant circulates a flow channel of the refrigerant circulation pipe 22 to be recovered to the freezing motor 231.

As described above, when a refrigerant is circulated to the refrigerant circulation pipe 22, evaporated steam existing within the receiving portion 21 fixed and attached to hyalin (not shown) while being changed to a thin ice form and thus only air is absorbed into the vacuum pump 90.

In this case, the trap portion 20 has the same configuration as that applied to a generally use cold trap, and a method in which evaporated steam discharged from the vacuum dryer 80 is absorbed into the vacuum pump via the trap portion 20 is the same as that of the general cold trap.

The insulation portion 30 is received at an upper surface of the main body 10 and may be formed in a circle shape or a quadrangle shape.

In this case, the insulation portion 30 has a second receiving hole 30a penetrated in a vertical direction.

Therefore, the insulation portion 30 is received at an upper surface of the main body 10 such that the second receiving hole 30a locates on a vertical line of the first receiving hole 11.

A portion of the receiving portion 21 is received in the first receiving hole 11 and another portion thereof is received in a second receiving hole 30a, and the receiving flange 211 is received at an upper surface of the insulation portion 30.

While the insulation portion 30 prevents the main body 10 and the receiving portion 21 from contacting, the insulation portion 30 enables insulation between the main body 10 and the receiving portion 21 to block cold of the receiving portion 21 from being conducted to the main body 10.

That is, because the cold trap 1 according to an exemplary embodiment of the present invention prevents a dew condensation phenomenon from occurring in the main body 10 through the insulation portion 30 to prevent moisture from occurring, the cold trap 1 can beforehand prevent a short circuit accident from occurring, as water flows into various electronic components installed in the main body 10 and thus stability of the cold trap 1 can be secured.

Further, in a conventional cold trap, as water generated at an upper surface of the main body 10 flows the inside of the main body 10, in order to prevent a short circuit accident from occurring, moisture should be frequently wiped, but in the present invention, because it is unnecessary to wipe moisture, there is a merit that use convenience can be provided.

Further, because a temperature of the cooled receiving portion 21 is not lowered with heat exchange with the main body 10, the inside of the receiving portion 21 may maintain a predetermined temperature, and thus there is a merit that energy efficiency can be maximized and that evaporated steam can be efficiently removed.

The insulation portion 30 may be coupled or separated to and from the main body 10 through a pressing fixing portion 50 with a stable and simple method.

For this reason, at an upper surface of the insulation portion 30 and the main body 10, a plurality of fastening holes 12 and 30b located on a vertical line while being penetrated in a vertical direction are formed at a gap.

At an upper end portion of the receiving flange 211 and an upper end portion of the insulation portion 30, a circular plate-shaped block plate 60 is received, and at an edge of the block plate 60, a plurality of through-holes 60a located on a vertical line of the fastening holes 12 and 30b are formed.

The pressing fixing portion 50 includes a pressing portion 51 and a fastening portion 52 integrally formed with the pressing portion 51 and having a helix at an outer circumferential edge thereof.

The fastening portion 52 passes through the through-hole 60a at a upper portion of the block plate 60 to be sequentially fastened to the fastening hole 30b of the insulation portion 30 and the fastening hole 12 of the main body 10, and while the pressing portion 51 moves downward by a fastening operation of the fastening portion 52, the pressing portion 51 presses the insulation portion 30 with the block plate 60 and thus the block plate 60 presses and fixes the insulation portion 30 to the main body 10.

That is, because the cold trap 1 according to an exemplary embodiment of the present invention may couple or separate the insulation portion 30 to and from the main body 10 through the pressing fixing portion 50 with a simple method, when abnormality occurs in the insulation portion 30 and the trap portion 20, easy maintenance can be performed.

Figure 6:
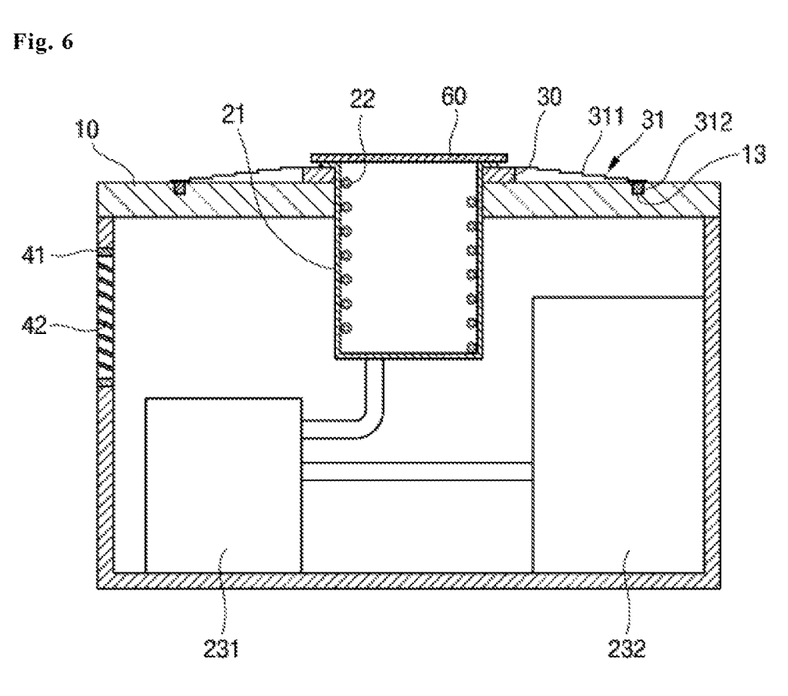
FIG. 6 is a cross-sectional view illustrating a fixing portion applied to a cold trap according to an exemplary embodiment of the present invention.

FIG. 6 is a cross-sectional view illustrating a fixing portion applied to a cold trap according to an exemplary embodiment of the present invention, and at an upper surface of the main body 10, an insertion groove 13 separated by a predetermined gap along an edge of the first receiving hole 11 is formed, and a fixing portion 31 fixed to the insertion groove 13 is formed at a gap along an edge of the insulation portion 30.

In this case, in the present exemplary embodiment, the block plate 60 may be fixed to the insulation portion 30 through an adhesive, silicon, or a tape.

The fixing portion 31 includes a rotation portion 311 rotatably connected to the insulation portion 30 in a vertical direction and an insertion protrusion 312 formed at a bottom surface of the rotation portion 311.

The rotation portion 311 may be formed in a continuously bent step shape or in a wave shape in a horizontal direction and a vertical direction and may be made of a metal material having an excellent elastic force.

That is, because the rotation portion 311 is formed in a step shape or a wave shape, the rotation portion 311 may easily rotate in a vertical direction, and when rotating, the rotation portion 311 is not easily broken.

The insertion protrusion 312 is formed in the same size and shape as that of the insertion groove 13, and when the rotation portion 311 rotates in a lower direction, the rotation portion 311 is inserted into the insertion groove 13 to fix the insulation portion 30 to the main body 10.

In such a case, there is a merit that the insulation portion 30 may be fixed to the main body 10 with one touch method.

Figure 7:
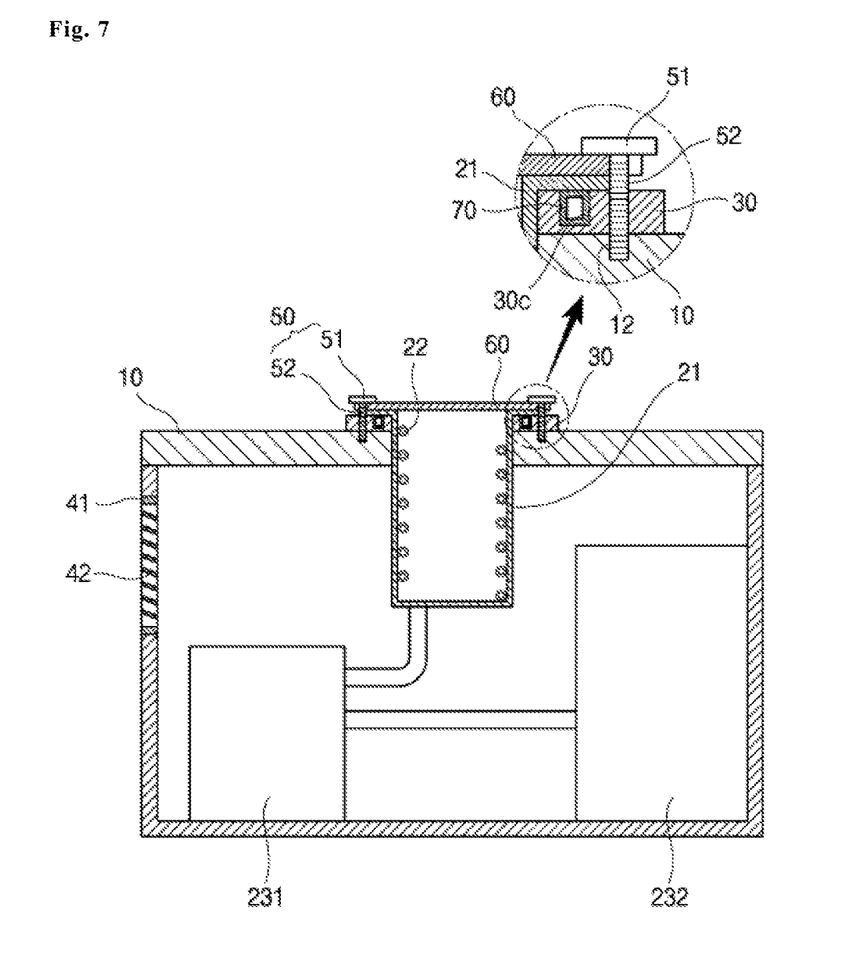
FIG. 7 is a cross-sectional view illustrating a thermal conduction suppression portion applied to a cold trap according to an exemplary embodiment of the present invention.

FIG. 7 is a cross-sectional view illustrating a thermal conduction suppression portion applied to a cold trap according to an exemplary embodiment of the present invention, and a thermal conduction suppression portion 70 may be formed by filling air within a tube.

Specifically, the thermal conduction suppression portion 70 is formed in a ring shape, and a receiving groove 30c that receives the thermal conduction suppression portion 70 is formed in a circumference direction of an upper surface of the insulation portion 30.

By forming a kind of air layer in the insulation portion 30, the thermal conduction suppression portion 70 suppresses cold of the receiving portion 21 from being conducted to the main body 10, thereby preventing a dew condensation phenomenon from occurring in the main body 10.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cold trap, comprising:
   a main body connectable to an exhaust line between a vacuum dryer and a vacuum pump, the main body having an upper horizontal surface;
   a trap portion suspended by a flange of the trap portion through a first receiving hole in the upper horizontal surface to extend at least partially within the main body, the trap portion capable of freezing evaporated steam supplied from the vacuum dryer when the main body is connected to the exhaust line; and
   an insulation portion installed between the upper horizontal surface of the main body and the trap portion and that blocks cold of the trap portion from being conducted to the upper horizontal surface of the main body, the insulation portion supporting the flange.

2. The cold trap of claim 1 where the insulation portion defines a cavity and structurally supports the flange of the trap portion around the periphery of the cavity and in a spaced-apart relationship from the main body portion.

3. The cold trap of claim 2 where the insulation portion prevents any contact between the trap portion and the main body.

4. The cold trap of claim 1 where the flange of the trap portion encircles an upper periphery of the trap portion.

5. The cold trap of claim 1, wherein
   the insulation portion has a second receiving hole penetrated in a vertical direction and is received at the upper horizontal surface of the main body such that the second receiving hole is positioned above the first receiving hole, and
   an upper edge of the trap portion is received at an upper surface of the insulation portion while the trap portion is received in the first receiving hole and the second receiving hole.

6. The cold trap of claim 2, wherein
   the cold trap further comprises a pressing fixing portion that comes in close contact with the main body by pressing the insulation portion while being sequentially fastened to a first fastening hole associated with the insulation portion and a second fastening hole associated with the main body, the first fastening hole and the second fastening hole aligned with each other in a vertical direction while being penetrated in a vertical direction.

7. The cold trap of claim 1 where the insulation portion completely separates the trap portion from the main body.

8. The cold trap of claim 1, wherein
   the cold trap further comprises a pressing fixing portion that comes in close contact with the main body by pressing the insulation portion while being sequentially fastened to a first fastening hole associated with the insulation portion and a second fastening hole associated with the main body, the first fastening hole and the second fastening hole aligned with each other in a vertical direction while being penetrated in a vertical direction.

9. The cold trap of claim 1, wherein the main body defines a first receiving hole for the trap portion, the insulation portion defines a second receiving hole for the trap portion, and the trap portion, insulation portion, and main body each include a plurality of respective fastening apertures that, when coaxially aligned, are configured to allow the trap portion to be secured to the main body through the first and second receiving holes such that there is no contact between the main body and the trap portion.

10. A cold trap comprising:
    a main body, the main body having an upper horizontal surface defining a receiving hole;
    a trap portion having a trap chamber suspended downwardly through the receiving hole from the horizontal surface of the main body, the trap chamber rigidly retained within the receiving hole and connectable to an exhaust line between a vacuum dryer and a vacuum pump to freeze evaporated steam supplied from the vacuum dryer when the main body is connected to the exhaust line; where
    the trap portion having a support flange that is supported by but spaced apart from the upper surface of the main body to prevent heat exchange between the main body and the trap portion.

11. The cold trap of claim 10 including an insulation portion interposed between the trap portion and the main body.

12. The cold trap of claim 11 where the horizontal surface is a flanged surface supported by the insulation portion.

13. The cold trap of claim 11 where the insulation portion has a second receiving hole configured such that the trap portion extends through the first receiving hole and the and second receiving hole without contacting the main body.

14. The cold trap of claim 11, wherein
    the cold trap further comprises a pressing fixing portion that comes in close contact with the main body by pressing the insulation portion while being sequentially fastened to a first fastening hole associated with the insulation portion and a second fastening hole associated with the main body, the first fastening hole and the second fastening hole aligned with each other in a vertical direction while being penetrated in a vertical direction.

15. The cold trap of claim 11 where the insulation portion completely separates the trap portion from the main body.

16. The cold trap of claim 11, wherein the insulation portion defines a second receiving hole for the trap portion, and the trap portion, insulation portion, and main body each include a plurality of respective fastening apertures that, when coaxially aligned, are configured to allow the trap portion to be secured to the main body through the receiving hole and the second receiving hole such that there is no contact between the main body and the trap portion.

17. The cold trap of claim 10 where there is no contact between the trap portion and the main body.

* * * * *